United States Patent
Kazakov

(10) Patent No.: US 12,443,407 B2
(45) Date of Patent: Oct. 14, 2025

(54) ACCELERATED PROCESSING DEVICE AND METHOD OF SHARING DATA FOR MACHINE LEARNING

(71) Applicant: Advanced Micro Devices, Inc., Santa Clara, CA (US)

(72) Inventor: Maxim V. Kazakov, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/364,780

(22) Filed: Jun. 30, 2021

(65) Prior Publication Data

US 2023/0004385 A1   Jan. 5, 2023

(51) Int. Cl.
| | |
|---|---|
| *G06F 15/80* | (2006.01) |
| *G06F 9/30* | (2018.01) |
| *G06F 9/38* | (2018.01) |
| *G06F 9/50* | (2006.01) |
| *G06F 9/54* | (2006.01) |
| *G06N 20/00* | (2019.01) |

(52) U.S. Cl.
CPC .......... *G06F 9/3001* (2013.01); *G06F 9/3012* (2013.01); *G06F 9/3887* (2013.01); *G06F 9/3888* (2023.08); *G06F 9/5016* (2013.01); *G06F 9/5072* (2013.01); *G06F 9/544* (2013.01); *G06F 15/8007* (2013.01); *G06F 15/8046* (2013.01); *G06N 20/00* (2019.01)

(58) Field of Classification Search
CPC .............. G06F 9/3887; G06F 15/8007; G06F 15/8046; G06N 3/063
See application file for complete search history.

(56) References Cited

U.S. PATENT DOCUMENTS

| | | | | |
|---|---|---|---|---|
| 8,108,625 B1 * | 1/2012 | Coon | ................... | G06F 13/1663 |
| | | | | 711/158 |
| 10,915,297 B1 * | 2/2021 | Halutz | .................. | G06F 17/153 |
| 11,068,641 B1 * | 7/2021 | Wu | ........................ | G06F 30/398 |

(Continued)

FOREIGN PATENT DOCUMENTS

| | | |
|---|---|---|
| JP | 2013-122769 A | 6/2013 |
| KR | 10-2016-0141675 A | 12/2016 |

OTHER PUBLICATIONS

Guirado et al.; Characterizing the Communication Requirements of GNN Accelerators: A Model-Based Approach, 2019 IEEE International Symposium on Circuits and Systems (ISCAS), IEEE, May 22, 2021, pp. 1-5, XP033932633.

(Continued)

*Primary Examiner* — Jacob Petranek
(74) *Attorney, Agent, or Firm* — Volpe Koenig

(57) ABSTRACT

A processing device is provided which comprises a plurality of compute units configured to process data, a plurality of arithmetic logic units, instantiated separate from the plurality of compute units, and configured to store the data at the arithmetic logic units and perform calculations using the data and an interconnect network, connecting the arithmetic logic units and configured to provide the arithmetic logic units with shared access to the data for communication between the arithmetic logic units. The interconnect network is also configured to provide the compute units with shared access to the data for communication between the compute units.

20 Claims, 6 Drawing Sheets

(56) References Cited

U.S. PATENT DOCUMENTS

| | | |
|---|---|---|
| 2004/0117597 A1 | 6/2004 | Kailas et al. |
| 2006/0101245 A1* | 5/2006 | Nair .................... G06F 9/30098 |
| | | 712/E9.067 |
| 2014/0115224 A1* | 4/2014 | Sanghai .............. G06F 9/30007 |
| | | 710/317 |
| 2017/0103304 A1 | 4/2017 | Henry et al. |
| 2019/0004794 A1* | 1/2019 | Raghavan ............. G06F 9/3001 |
| 2019/0205061 A1 | 7/2019 | Weissmann et al. |
| 2019/0332903 A1 | 10/2019 | Nealis et al. |
| 2020/0272506 A1 | 8/2020 | Ramesh |
| 2021/0110247 A1 | 4/2021 | Venkataramani et al. |
| 2022/0129521 A1* | 4/2022 | Surti ......................... G06T 1/60 |

OTHER PUBLICATIONS

Zhang et al.; "High-speed object detection based on a hierarchical parallel vision chip", 2015 IEEE 11th International Conference on ASIC, (ASICON), IEEE, Nov. 3, 2015, pp. 1-4, XP032925881.

Chen et al.; LoopPara: an Architecture- Transparent Acceleration Framework for Loops by Exploiting Data-Level Parallelism: 2021 IEEE 6th International Conference on Computer and Communication Systems (ICCCS) IEEE, Apr. 23, 2021, pp. 22-27, XP033927377.

Zyuban et al.; "Optimization of high-performance superscalar arthitectures for energy efficiency", Low Power Electronics and Design, 2000, ISLPED '00. Proceedings of the 2000 International Symposium on Jul. 25-27, 2000, Piscataway, NJ, USA, IEEE, 2 Penn Plaza, Suite 701, New York, NY 10121-0701. Aug. 1, 2000, pp. 84-89, XP058348063.

\* cited by examiner

ACCELERATED PROCESSING DEVICE AND METHOD OF SHARING DATA FOR MACHINE LEARNING

BACKGROUND

Machine learning (e.g., deep learning) is widely used in a variety of technologies (e.g., image classification) to make predictions or decisions to perform a particular task (e.g., whether an image includes a certain object). For example, a convolutional neural network (CNN) is a class of deep learning algorithms widely used in machine learning applications. These networks typically include multiple layers. At each layer, a set of filters is applied to the output of previous layer, and the outputs of each layer are written to and read from memory.

BRIEF DESCRIPTION OF THE DRAWINGS

A more detailed understanding can be had from the following description, given by way of example in conjunction with the accompanying drawings wherein.

DETAILED DESCRIPTION

Figure 1:
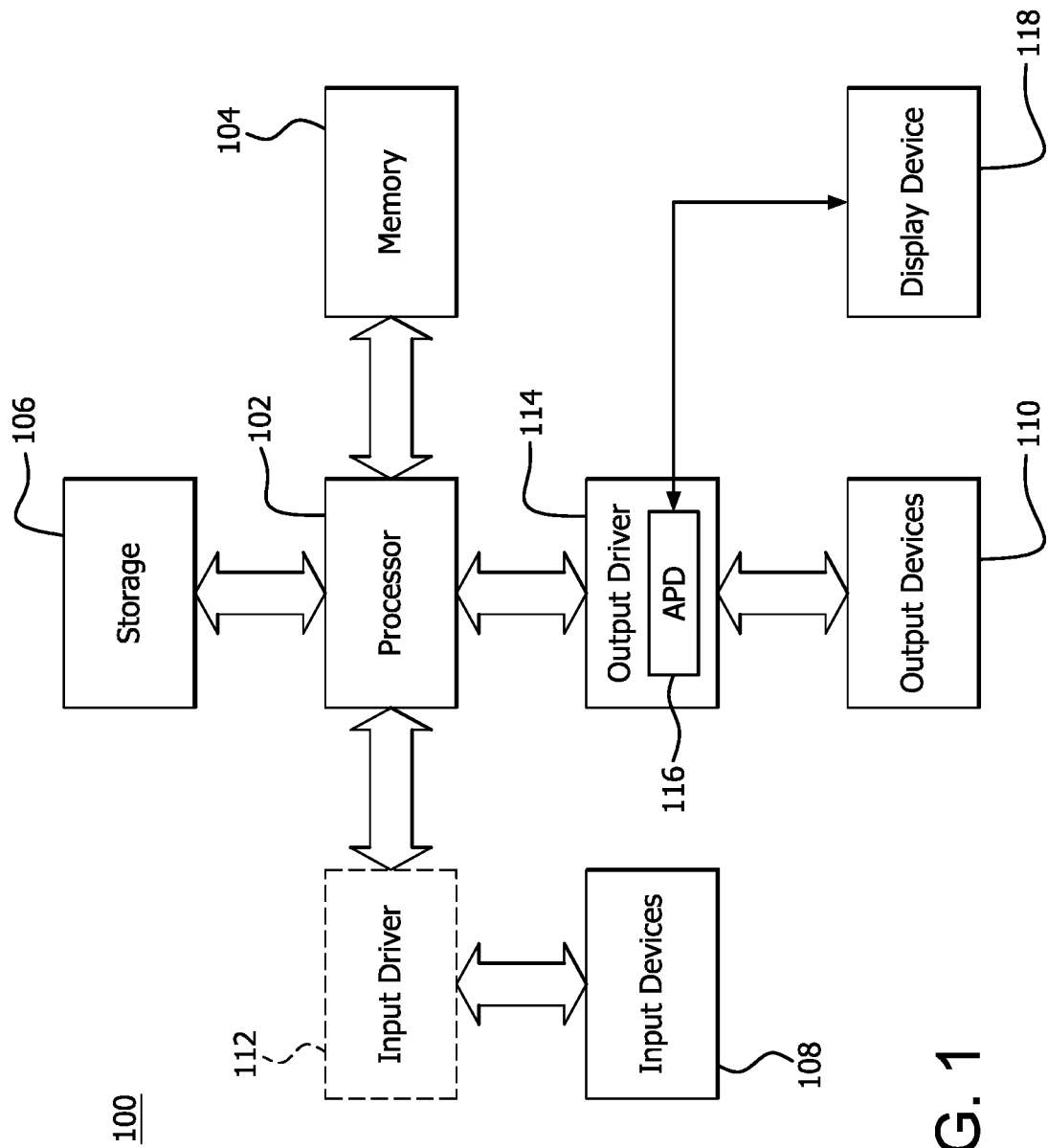
FIG. 1 is a block diagram of an example device in which one or more features of the disclosure can be implemented.

Machine learning models typically use significant memory bandwidth, which can lead to bandwidth bottleneck, negatively impacting performance, and increased power consumption. The amount of memory used to store output data at different layers of machine learning neural networks is typically large such that the data cannot be saved in on-chip memory. Accordingly, storing the data includes transfer of the data to and from off-chip memory.

Deep learning algorithms (e.g., CNNs, recurrent neural networks and other forms of artificial neural networks) typically include matrix multiplication. Accelerated processors, such as GPUs, have recently been used to perform various matrix multiplication techniques which employ parallelization to increase the efficiency of matrix multiplication. For example, two matrices are typically divided into smaller portions (e.g., columns, rows, and portions of columns and rows) and a matrix multiplication operation of the two matrices is performed by executing a plurality of matrix multiplication computations each including the multiplication of a portion of one matrix with a portion of another matrix. The matrix multiplication computations are mapped to and executed by different processor cores of a processor network to perform the matrix multiplication operation.

Conventional GPU architectures are not well suited for machine learning. Operations processed during execution of machine learning applications, typically include a series of operations, such as matrix multiplication operations followed by other operations (e.g., post processing operations, such as ReLU and BatchNorm) in which operations are performed using the data resulting from the matrix multiplication operations. The data resulting from the matrix multiplication operations is processed, during these post processing operations, in the CUs of the GPU. Accordingly, if sufficient bandwidth is not available for the CUs to access the resulting data, bottlenecks occur. The cache subsystem architecture (e.g., L1, L2 cache and so on) of conventional GPUs does not, however, provide sufficient bandwidth to share the data between the CUs quickly enough to prevent bottlenecks, which negatively impacts the overall performance.

Recent developments to GPU architecture prevent these bottlenecks by instantiating, within in each CU, dedicated arithmetic logic units ALUs used to process the matrix multiplication operations while post processing operations are realized on existing ALU units of the CU. While these dedicated ALUs, instantiated within in each CU prevent the bottlenecks described above, the dedicated ALUs typically cause other types of bottlenecks resulting from data being inefficient fetched multiple times during matrix multiplication operations.

For example, matrix multiplication typically includes reusable data. When two matrices are multiplied, the data for the first matrix is used for multiple blocks of the second matrix. The same data for the first matrix is fetched repeatedly into different CUs to multiply with blocks of another matrix. That is, bottlenecks (i.e., matrix multiplication bottlenecks) typically result because the same data is inefficient fetched multiple times, from the cache subsystem architecture of the GPU, for the dedicated arithmetic logic units ALUs in each CU.

Some conventional accelerated processors are designed for data reuse and include interconnects between the ALUs instantiated in each CU for data sharing between CUs to reduce these matrix multiplication bottlenecks. These dedicated accelerated processors, however, are not well suited for executing non-matrix multiplication operations.

The present disclosure provides devices and methods for efficiently executing matrix multiplication operations and non-matrix multiplication operations. Features of the present disclosure include ALUs, instantiated separate from the CUs and dedicated ALU interconnects, connecting the ALUs, and configured to provide shared access to data by the CUs. Each ALU includes its own register file (e.g., scratchpad memory) for storing the data provided to the ALUs and receiving data resulting from executing operations, such as matrix multiplication calculations. The register files are accessible by each CUs to store the data, which the ALUs use to perform calculations and to read the data to perform as post processing operations.

Although the data is sent from the ALUs to the CU to execute the post matrix multiplication operations, features of the present disclosure provide bandwidth sufficient to avoid bottlenecks for execution of matrix multiplication operations and bandwidth sufficient to avoid bottlenecks for execution of other operations such as postprocessing operations. Accordingly, the overall efficiency is increased.

A processing device is provided which comprises a plurality of compute units configured to process data, a plurality of arithmetic logic units, instantiated separate from the plurality of compute units, and configured to store the data at the arithmetic logic units and perform calculations using the data and an interconnect network, connecting the arithmetic logic units and configured to provide the arithmetic logic units with shared access to the data for communication between the arithmetic logic units.

A method of data sharing is provided which comprises receiving, at one of a plurality of arithmetic logic units instantiated separate from a plurality of compute units, an instruction to perform a matrix multiplication calculation when data, used to perform the matrix multiplication calculation, is available in a local register file of the one arithmetic logic unit, accessing the data from the local register file to perform the matrix multiplication calculation and when the data is not available in a local register file, but is available in a register file of one of the other arithmetic logic units, accessing the data from the register file of the other arithmetic logic unit via one or more interconnects connecting the arithmetic logic units.

A processing device is provided which comprises a plurality of groups of compute units configured to process data, a plurality of groups of arithmetic logic units instantiated separate from the plurality of groups of compute units and configured to store the data at the arithmetic logic units and perform calculations using the data and a plurality of interconnect networks, each connecting the arithmetic logic units of one of the groups of arithmetic logic units and providing the arithmetic logic units, of the one group of arithmetic logic units, shared access to the data.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
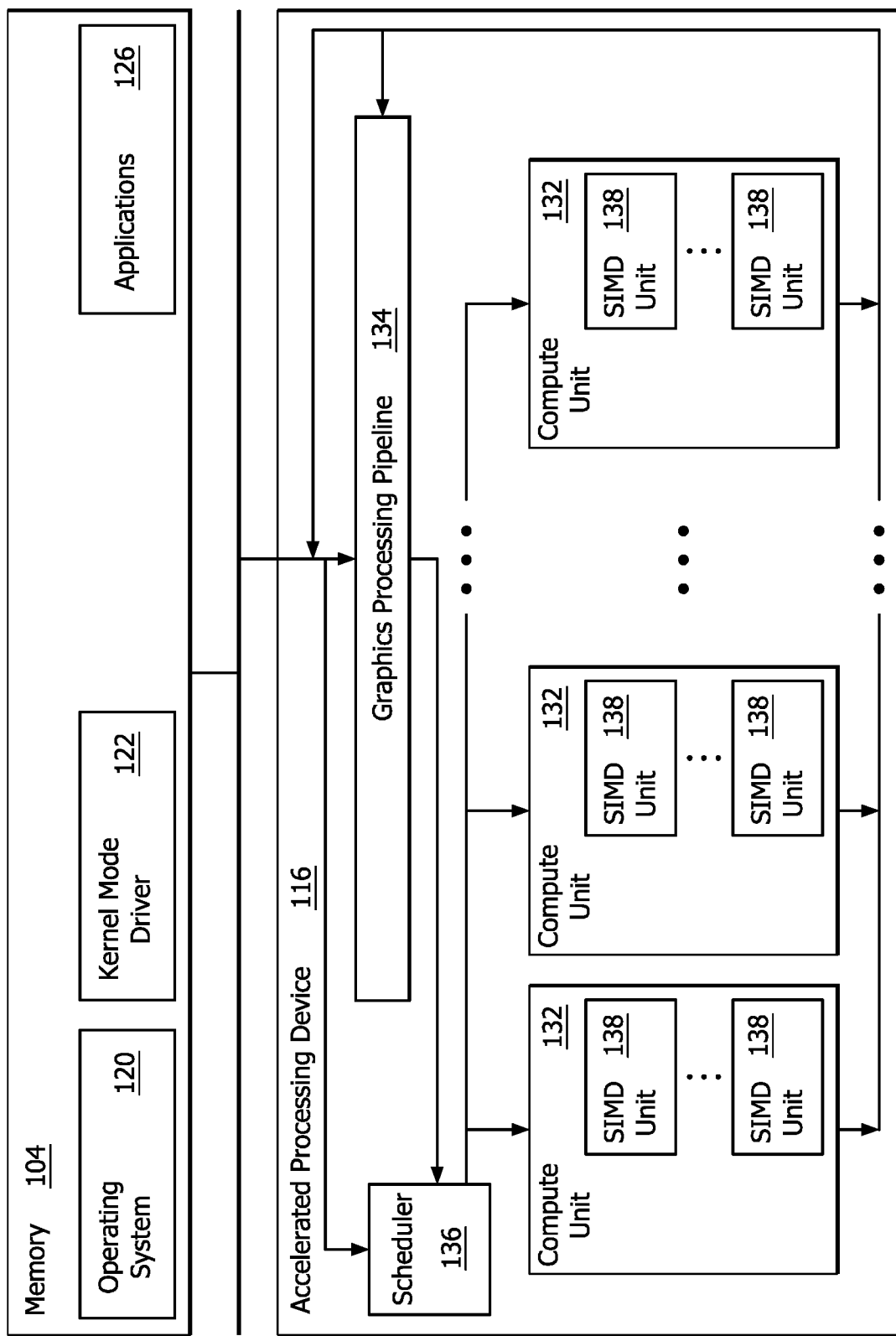
FIG. 2 is a block diagram illustrating example components for implementing one or more features of the disclosure.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations, such as matrix multiplication operations, as well as non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 is configured to execute machine learning applications, including matrix multiplication operations as well as non-matrix multiplication operations. As described in more detail below, the APD 116 is configured to execute matrix multiplication operations execute other operations, such as post matrix multiplication operations.

As described above, the amount of memory used to store the activation tensor data at different layers of neural networks is typically large (e.g., in the early layers) such that the activation tensor data cannot be saved in on-chip memory (e.g., memory at the APD 116). Accordingly, storing the activation tensor data includes transfer of the data between the APD 116 and off-chip memory (e.g., memory 104) via a link (e.g., a bus). The APD 116 is configured to compress the data to be transferred to off-chip memory (e.g., save bandwidth).

The APD 116 is configured to compress the tensor data by changing the order in which the tensor values are stored according to any of a plurality of feature map sparsity metrics, using any of a plurality of different types of memory formatting with channel first configuration, and using any of a plurality of types of compression algorithms. For simplified explanation purposes, the examples described herein include delta-based compression of 4D tensor values by changing the order in which the tensor values are written to memory according to NHWC (i.e., channel first) formatting based on sparsity of the feature maps.

Figure 3:
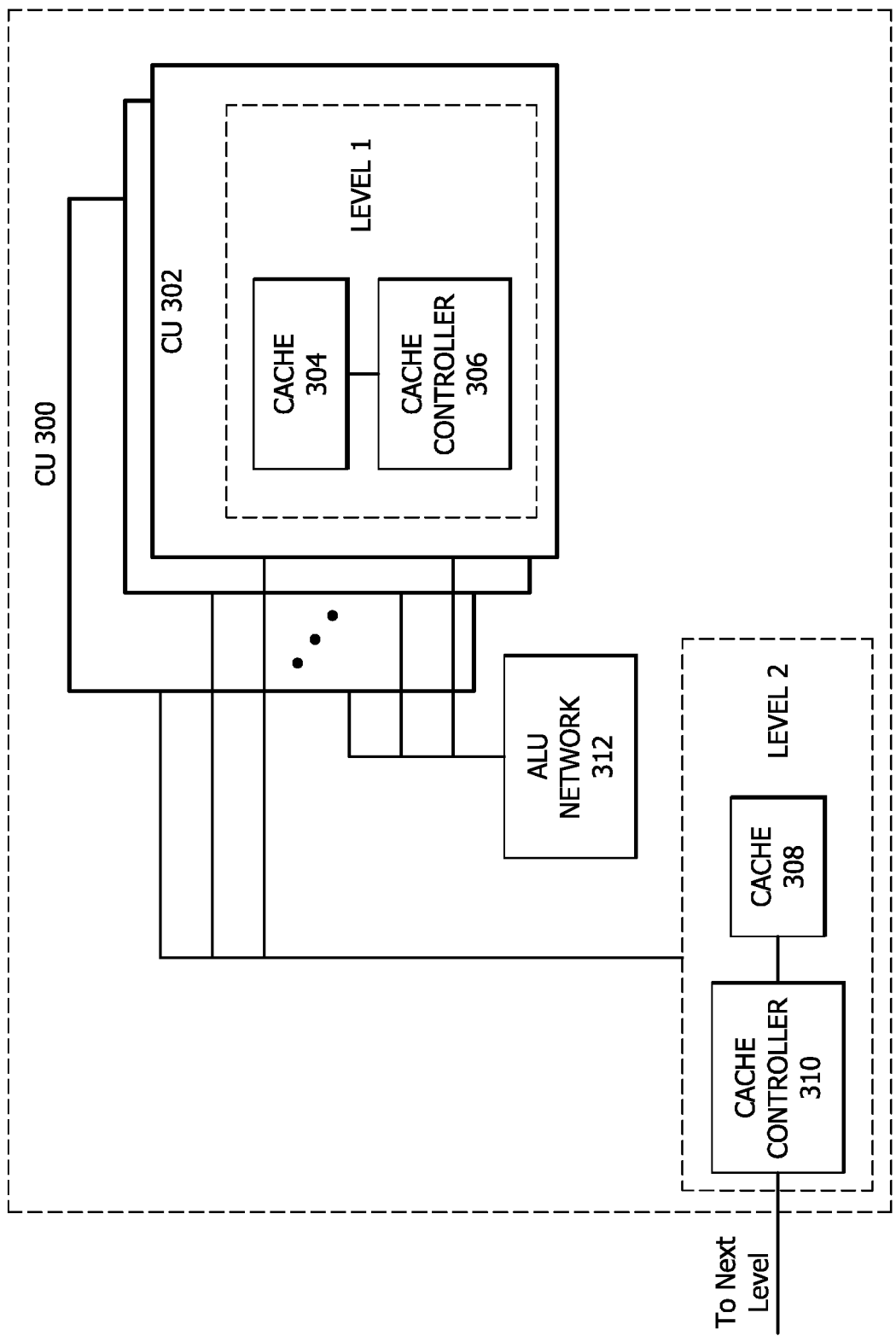
FIG. 3 is a block diagram illustrating example components of an accelerated processing device for implementing one or more features of the disclosure.

FIG. 3 is a block diagram illustrating example components of an accelerated processing device for implementing one or more features of the present disclosure. For simplified explanation, the accelerated processing device is described as a GPU 300. The GPU 300 is an example of an accelerated processing device.

As shown in FIG. 3, GPU 300 include a plurality of compute units 302. Each compute unit 302 includes a corresponding level 1 cache controller 306 in communication with a corresponding level 1 cache 304. As further shown in FIG. 3, GPU 300 includes a level 2 cache controller 310 in communication with level 2 cache 308. Level 2 cache 308 is shared by each of the CUs 302. Cache controller 310 can also be in communication with a next cache level (higher cache level), as indicated in FIG. 3.

GPU 300 also includes ALU network 312. ALU network 312 includes a plurality of ALUs, instantiated separate from the CUs 302 as well as dedicated ALU interconnects, connecting the ALUs to provide shared access to data, by the CUs 302, in register files of the ALUs as described in more detail below with regard to FIG. 4.

Figure 4:
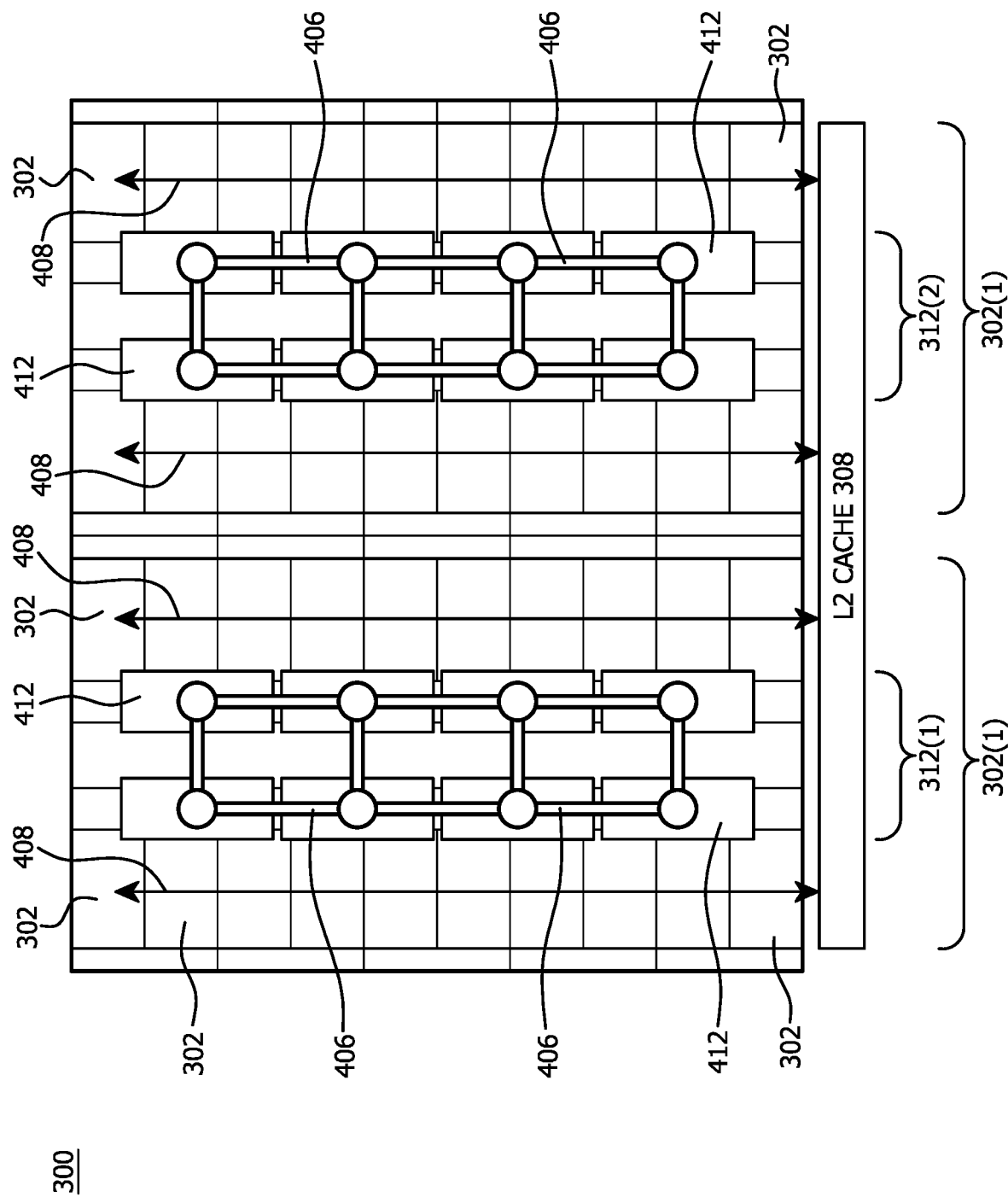
FIG. 4 is a block diagram illustrating example components of the accelerated processing device shown in FIG. 3 with additional detail.

FIG. 4 is a block diagram illustrating example components of the GPU 300 shown in FIG. 3 with additional detail. As shown in FIG. 4, GPU 300 includes a first group of CUs 302(1), a second group of CUs 301(2), a first ALU network 312(1), a second ALU network 312(2). The GPU 300 also includes level 2 cache 304 and interconnects 408 for data access, by the CUs 302, to the level 2 cache 304.

FIG. 4 illustrates two groups of CUs (i.e., 302(1) and 301(2)) and two ALU networks (i.e., 312(1) and 312(2)). The number of CU groups and 301(2)) and the number of ALU networks shown in FIG. 4 is merely an example. Features of the present disclosure can be implemented using any number CU groups and any number of ALU networks. FIG. 4 also illustrates twenty CUs 302 in each CU group (302(1) and 301(2)) and eight ALUs 412 in each ALU networks (312(1) and 312(2)). The number of CUs shown in each group and the number ALUs shown in each ALU network is merely an example. Features of the present disclosure can be implemented using any number of CUs per group and any number ALUs per ALU network.

Each of the ALU networks 312(1) and 312(2) include a plurality of ALUs 412 and a plurality of interconnects 406. Each ALU 412 includes its own corresponding register file, such as for example scratchpad memory 502 shown in FIG. 5. The interconnects 406 provide each of the ALUs 412 with shared access to the data stored at other ALUs 412 for communication between the ALUs 412. The interconnects 406 also provide each of the CUs 302 with shared access to the data stored at any of the ALUs 412 for communication between the CUs 302. As shown in FIG. Accordingly, the register files (e.g., scratchpad memory 502) are used to store data provided to the ALUs 412 (e.g., by other ALUs 412 and CUs 302) and to store data resulting from performing calculations during execution of operations, such as matrix multiplication operations and post matrix multiplication operations. The data stored in the scratchpad memory 502 is also read from other ALUs 412 and CUs 302 to perform matrix multiplication calculations and perform postprocessing operations.

Figure 5:
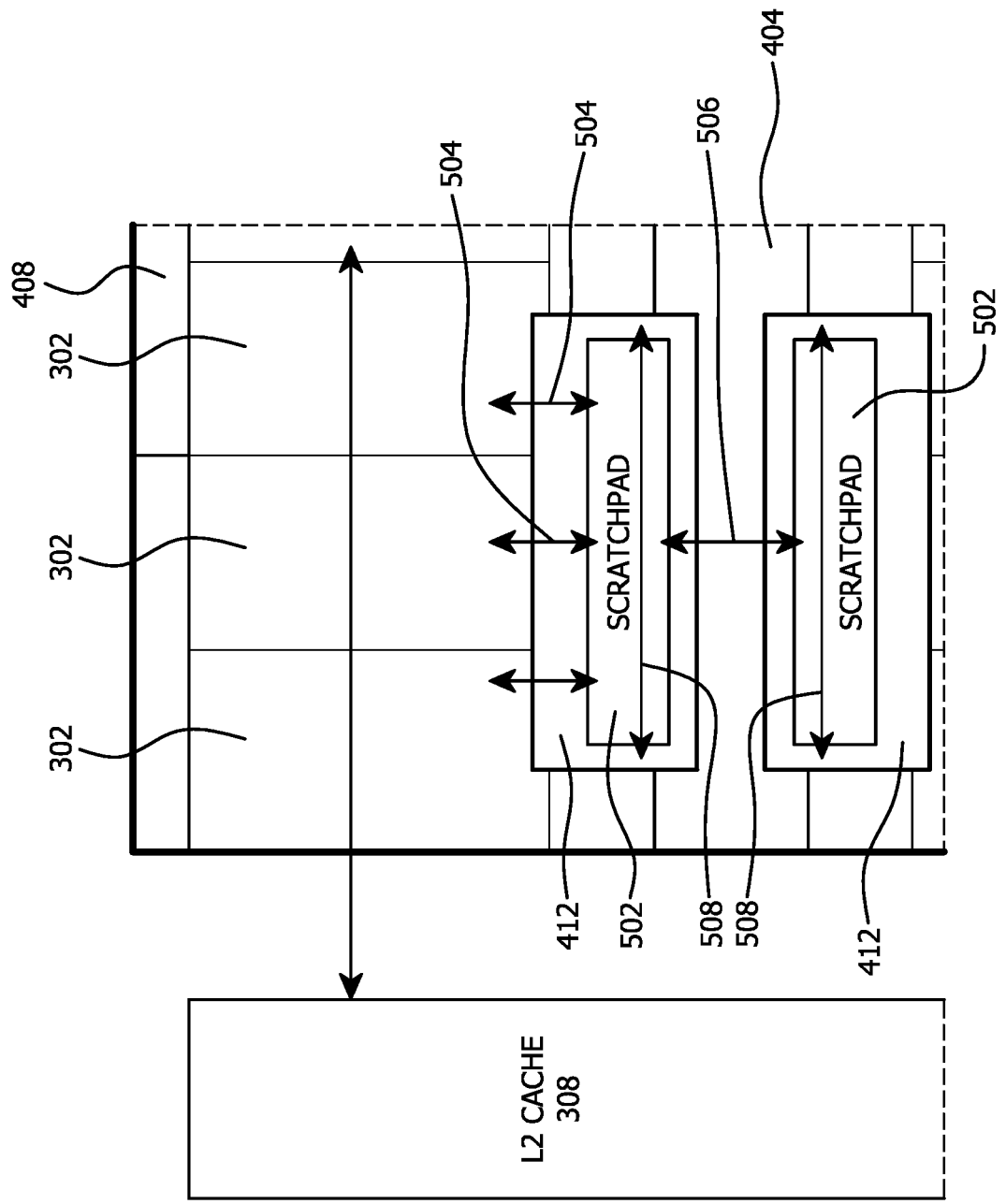
FIG. 5 is a block diagram illustrating example interconnections between components of the accelerated processing device shown in FIG. 4.

FIG. 5 is a block diagram illustrating example interconnections between components of the accelerated processing device shown in FIG. 4. The arrows shown in FIG. 5 are used to represent interconnects between the ALUs and CUs 302. The register files of each ALU 412 is directly accessible by a plurality of CUs 302. For example, as indicated by arrow 504 in FIG. 5, the scratchpad memory 502 of the top ALU 412 in FIG. 5 is in direct communication with three of the CUs 302 (3 leftmost CUs 302 in FIG. 5) and is connected to the scratchpad memory 502 of the adjacent ALU 412 (as indicated by arrow 506). The scratchpad memories 502 of other ALUs 412 of the ALU network are connected via arrows 508. That is, the scratchpad memory 502 of the other ALUs 412 of a corresponding ALU network are indirect accessible by the top ALU 412 in FIG. 5 via the interconnects represented by arrows 506 and 508.

Figure 6:
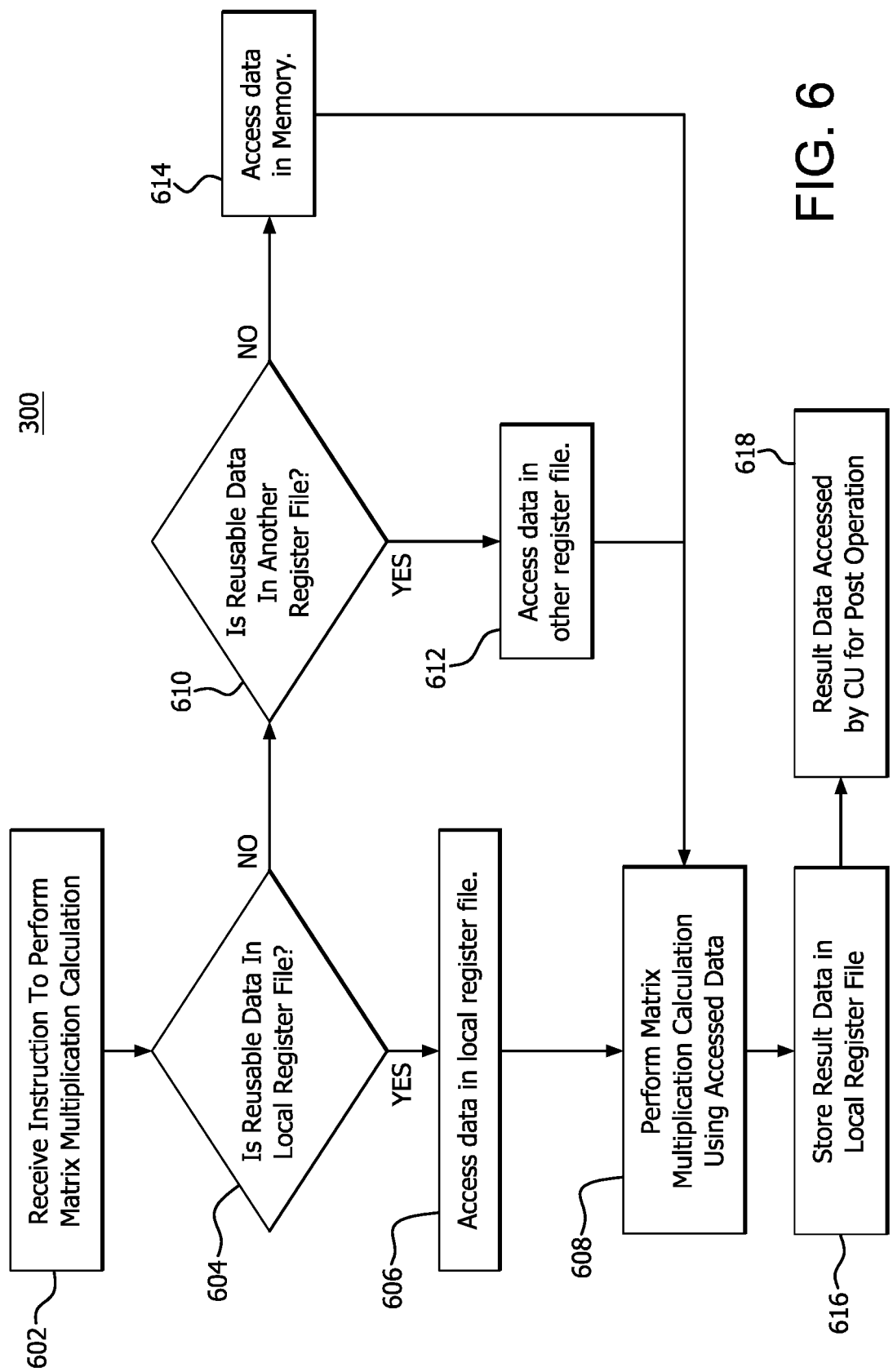
FIG. 6 is a flow diagram illustrating an example method of data sharing according to features of the present disclosure.

FIG. 6 is a flow diagram illustrating an example method 600 of data sharing according to features of the present disclosure.

As shown at block 602, the method 600 includes receiving an instruction to perform a matrix multiplication calculation. For example, an instruction to perform the matrix multiplication calculation is received from one of the CUs 302.

As described above, in many cases, previously stored data is reusable for performing matrix multiplication calculations. Accordingly, the ALU first determines whether reusable data is available (i.e., stored) in its own local register file (e.g., scratchpad memory) at decision block 604. When the reusable data is available in its own local register file (YES decision), the ALU accesses the data, at block 606, and uses the data along with other accessed data to perform the matrix multiplication calculation using the data at block 608.

When the reusable data is not available in its own local register file (NO decision), the ALU determines whether reusable data is available (i.e., stored) in a register file of another ALU (e.g., closest ALU), at decision block 610. When the reusable data is available in a register file of another ALU (YES decision), the ALU accesses the data, via one or more of the interconnects 406, from the register file of the other ALU, at block 612, and uses the data along with other accessed data to perform the matrix multiplication calculation using the data at block 608.

When the reusable data is not available in the register file of another ALU (NO decision), the ALU accesses the data from memory (e.g., cache memory or main memory) at block 614, and uses the data along with other accessed data to perform the matrix multiplication calculation using the data at block 608.

When the matrix multiplication calculation is completed, the data resulting from the matrix multiplication calculation performed at block 608 is stored in the local register file of the ALU at block 616. The result data can then be accessed by a CU to perform post processing operations described above. For example, the CU directly accesses the result data via an interconnect indicated by the arrows 504 (shown in FIG. 5) or accesses the result data from another ALU via one or more interconnects indicated by the arrows 504 and 506 ((shown in FIG. 5).

Accordingly, the accelerated processing device efficiently executes the matrix multiplication operations and the post processing operations using the high bandwidth architecture described herein.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, CU groups 302(1) and 301(2), ALU networks 312(1) and 312(2), ALU interconnects 406 and local register files, such as scratchpad memory 508, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   a plurality of compute units configured to process data;
   a plurality of arithmetic logic units that are each communicatively coupled to at least one of the plurality of compute units, each arithmetic logic unit including a memory configured to store a portion of the data, wherein the plurality of arithmetic logic units are configured to perform calculations using the data stored among the plurality of arithmetic logic units; and
   an interconnect network, connecting the arithmetic logic units, configured to enable direct data access to the memory of each of the arithmetic logic units by any of the arithmetic logic units.

2. The processing device of claim 1, wherein the interconnect network is also configured to provide communication between the plurality of the compute units.

3. The processing device of claim 1, wherein the memory is a scratchpad memory.

4. The processing device of claim 1, further comprising a plurality of interconnect networks, wherein,
the plurality of the compute units include groups of compute units,
the arithmetic logic units include groups of arithmetic logic units and
each interconnect network configured to connect the arithmetic logic units, of one of the groups of arithmetic logic units, with each other and to enable data access by any of the arithmetic logic units to the memory of the arithmetic logic units of the one group of arithmetic logic units.

5. The processing device of claim 1, wherein the interconnect network is configured to provide a data bandwidth to avoid pipeline bottlenecks:
during execution of matrix multiplication operations; and
during execution of post processing operations using the data resulting from the matrix multiplication operations.

6. The processing device of claim 5, wherein the data bandwidth of the interconnect network is greater than another data bandwidth of a second level cache memory which shares data among the plurality of compute units.

7. The processing device of claim 1, further comprising another interconnect network configured to connect the plurality of the compute units with memory and is not accessible by the arithmetic logic units for data communication.

8. The processing device of claim 1, wherein:
the plurality of arithmetic logic units are configured to collectively perform a matrix multiplication,
and at least one of the plurality of compute units is configured to directly access a result of the matrix multiplication using the interconnection network.

9. A method of data sharing comprising;
receiving, at a first arithmetic logic unit among a plurality of arithmetic logic units, an instruction to perform a matrix multiplication calculation, wherein each of the plurality of arithmetic logic units are that communicatively coupled to at least a plurality of compute units and the plurality of arithmetic logic units each include a memory;
when data, used to perform the matrix multiplication calculation, is available in the memory of the first arithmetic logic unit, accessing the data from the memory to perform the matrix multiplication calculation; and
when the data is not available in the memory of the first arithmetic logic unit, but is available in the memory of a second arithmetic logic unit among the plurality of the arithmetic logic units, directly accessing the data from the memory of the second arithmetic logic unit via one or more interconnects connecting the plurality of arithmetic logic units, wherein the one or more interconnects enable direct data access by any of the arithmetic logic units to the memory of each of the plurality of arithmetic logic units.

10. The method of claim 9, further comprising:
determining, by the first arithmetic logic unit, whether or not the data is available in the memory of the first arithmetic logic unit; and
when the data is determined to be not available in the memory of the first arithmetic logic unit, determining, by the first arithmetic logic unit, whether the data is available in the memory of the second arithmetic logic unit.

11. The method of claim 10, further comprising accessing the data from memory when the data is determined to be not available in the memory of the second arithmetic logic unit.

12. The method of claim 11, further comprising accessing the data from memory via another interconnect network which connects the compute units with memory and is not accessible by the arithmetic logic units for data communication.

13. The method of claim 9, further comprising performing, by the first arithmetic logic unit, the matrix multiplication calculation and storing data resulting from the matrix multiplication calculation in the memory of the first arithmetic logic unit.

14. The method of claim 13, further comprising accessing by one of the plurality of compute units, the data resulting from the matrix multiplication calculation in the memory of the second arithmetic logic unit via the one or more interconnects connecting the arithmetic logic units.

15. The method of claim 9, wherein
the compute units include groups of compute units,
the arithmetic logic units include groups of arithmetic logic units and
each interconnect network connects the arithmetic logic units, of one of the groups of arithmetic logic units, with each other and provides shared access to the memory of the arithmetic logic units of the one group of arithmetic logic units.

16. The method of claim 9, further comprising:
accessing the data from the memory of the second arithmetic logic unit, via the one or more interconnects connecting the arithmetic logic units, to perform the matrix multiplication calculation without causing a pipeline bottleneck; and
performing post processing operations using the data resulting from the matrix multiplication calculation without causing the pipeline bottleneck.

17. The method of claim 9, wherein the data bandwidth of the interconnects is greater than another data bandwidth of a second level cache memory which shares data among the plurality of compute units.

18. The method of claim 9, wherein
at least one of the plurality of compute units is configured to directly access a result of the matrix multiplication calculation using the one or more interconnects.

19. A processing device comprising:
a plurality of groups of compute units configured to process data;
a plurality of arithmetic logic units that are each communicatively coupled to at least one of the plurality of group of the compute units, each arithmetic logic unit including a memory configured to store a portion of the data, wherein the plurality of arithmetic logic units are configured to perform calculations using the data stored among the plurality of arithmetic logic units; and
a plurality of interconnect networks, each interconnect network configured to connect the arithmetic logic units of one of the groups of arithmetic logic units and to enable direct data access to the memory of each of the arithmetic logic units by any of the arithmetic logic units of the one group of arithmetic logic units.

20. The processing device of claim 19, wherein each interconnect network is configured to provide the compute units with shared access to the data.

* * * * *